(12) United States Patent
Hoheisel (10) Patent No.: US 10,759,535 B2
(45) Date of Patent: Sep. 1, 2020

(54) AIRBORNE LAUNCH OF INFLATABLE DEVICES

(71) Applicant: Raymond Hoheisel, Arlington, VA (US)

(72) Inventor: Raymond Hoheisel, Arlington, VA (US)

( * ) Notice: Subject to any disclaimer, the term of this patent is extended or adjusted under 35 U.S.C. 154(b) by 341 days.

(21) Appl. No.: 15/621,100

(22) Filed: Jun. 13, 2017

(65) Prior Publication Data

US 2017/0355462 A1 Dec. 14, 2017

Related U.S. Application Data

(60) Provisional application No. 62/349,849, filed on Jun. 14, 2016.

(51) Int. Cl.
*B64D 17/00* (2006.01)
*B64D 1/12* (2006.01)
(Continued)

(52) U.S. Cl.
CPC ............... *B64D 1/12* (2013.01); *B64B 1/40* (2013.01); *B64B 1/64* (2013.01); *B64D 17/02* (2013.01);
(Continued)

(58) Field of Classification Search
CPC .......... B64B 1/40; B64D 17/00; B64D 17/02; B64D 17/18
See application file for complete search history.

(56) References Cited

U.S. PATENT DOCUMENTS 2,973,928 A * 3/1961 Turolla ................. B64D 17/34
244/152
3,366,345 A * 1/1968 Pohl .......................... B64B 1/40
244/2
(Continued)

FOREIGN PATENT DOCUMENTS

CN 201133936 Y 10/2008
CN 102508502 A 6/2012

OTHER PUBLICATIONS

Lightweight Balloon/Aerostat Observation Payload System, downloaded from http://www.controp.com/item/speed-a-payload, 4 pages.
(Continued)

*Primary Examiner* — Richard G Davis
(74) *Attorney, Agent, or Firm* — Banner & Witcoff, Ltd.

(57) ABSTRACT

Aspects described herein relate to an apparatus, system, and method for the airborne launch of inflatable, lighter-than-air devices from aircraft. In some instances, a container comprising a drag parachute and a main parachute assembly may be deployed from an aircraft. Drag forces on the container may cause the drag parachute to be expelled from the container. Drag forces on the drag parachute may cause the main parachute assembly to be expelled from the container. The main parachute assembly may include a canopy with an opening and a release channel connecting the opening with the container. The container may further include a balloon inflation mechanism, which may be used to inflate one or more balloon envelopes. The one or more balloon envelopes, after being inflated, may be configured to be released from the container, traverse the release channel, and exit the main parachute assembly through the opening.

14 Claims, 5 Drawing Sheets

(51) Int. Cl.
*B64B 1/40* (2006.01)
*B64D 17/02* (2006.01)
*B64B 1/64* (2006.01)
*B64D 17/38* (2006.01)

(52) U.S. Cl.
CPC ........ *B64D 17/38* (2013.01); *B64C 2201/082* (2013.01); *B64C 2201/101* (2013.01)

(56) References Cited

U.S. PATENT DOCUMENTS

| | | | | |
|---|---|---|---|---|
| 3,595,501 | A | * | 7/1971 | Stencel .................. B64D 17/54 244/142 |
| 3,679,155 | A | * | 7/1972 | Centofanti ............. B64D 17/78 244/32 |
| 4,262,864 | A | | 4/1981 | Eshoo |
| 5,186,414 | A | | 2/1993 | Holzschuh et al. |
| 5,388,787 | A | * | 2/1995 | Webb .................... B64D 17/62 244/142 |
| 5,463,402 | A | | 10/1995 | Walrath et al. |
| 5,660,356 | A | | 8/1997 | Selfors et al. |
| 5,884,867 | A | | 3/1999 | Gordon et al. |
| 6,402,090 | B1 | | 6/2002 | Aaron |
| 7,046,934 | B2 | | 5/2006 | Badesha et al. |
| 7,567,779 | B2 | | 7/2009 | Seligsohn et al. |
| 8,061,648 | B2 | | 11/2011 | Lachenmeier |
| 8,157,205 | B2 | | 4/2012 | McWhirk |
| 8,733,697 | B2 | | 5/2014 | DeVaul et al. |
| 8,897,933 | B1 | | 11/2014 | Teller et al. |
| 9,010,691 | B1 | | 4/2015 | Ratner et al. |
| 9,030,149 | B1 | | 5/2015 | Chen et al. |
| 9,033,274 | B2 | | 5/2015 | DeVaul et al. |
| 9,045,213 | B1 | | 6/2015 | DeVaul |
| 2011/0290944 | A1 | * | 12/2011 | Sadeck .................. B64D 17/04 244/145 |
| 2014/0054412 | A1 | | 2/2014 | Guetta et al. |
| 2014/0191893 | A1 | | 7/2014 | Fox et al. |
| 2014/0288694 | A1 | | 9/2014 | Wagner et al. |
| 2015/0061937 | A1 | | 3/2015 | Bonawitz et al. |
| 2015/0298788 | A1 | | 10/2015 | Wang et al. |

OTHER PUBLICATIONS

Flaten, et al., "Techniquest for Payload Stabilization for Improved Photography During Stratospheric Balloon Flights," downloaded from http://via.library.depaul.edu/cgi/viewcontent.cgi?article=1037&context=ahac, 8 pages.

Kellogg, et al., "2014 WSGC Elijah High-Altitude Balloon Payload Project, Final Report," Aug. 15, 2014, downloaded from https://spacegrant.carthage.edu/ojs/index.php/wsc/article/download/116/115, 10 pages.

* cited by examiner

AIRBORNE LAUNCH OF INFLATABLE DEVICES

This application claims priority to provisional U.S. Application Ser. No. 62/349,849, filed Jun. 14, 2016, entitled "Airborne Launch of Inflatable Devices," herein incorporated by reference for all purposes.

FIELD

Aspects described herein are generally related to the airborne launch of inflatable, lighter-than-air devices. More specifically, aspects relate to apparatuses and systems for the launch of light gas balloons from airborne vehicles such as airplanes or helicopters.

BACKGROUND

High-altitude balloons have emerged as an increasingly utilized tool for the deployment of research, surveillance, and reconnaissance payloads. As compared to conventional means for payload deployment such as rockets and aircraft, which are technologically complex and capital-intensive, high-altitude balloons present a mechanically simple and low-cost alternative.

Lighter-than-air devices, such as balloons, offer a variety of advantages in comparison to other aircraft. For example, the advantages of lighter-than-air devices may include the ability to achieve ceiling altitudes of more than 100,000 ft (30 km), operational lifetimes of several days or more, small stowage volume due to thin and flexible envelope materials, stable flight characteristics, scalable payload capacity, and the low cost of manufacture, launch, and operation.

In the past, balloons have commonly been launched from ground sites. However, such launches can be difficult due to low altitude weather conditions like rain, storms, and hail, as well as other factors which can delay and prevent launchings. Further, availability of ground sites can be limited according to the geography and flora.

Launching balloons from aircraft can have significant advantages over launchings from ground based sites. Among others, advantages comprise the maneuverability to pursue changing weather patterns, the accessibility of remotely located or otherwise difficult to reach areas such as mountain ranges, coastal areas, flooded areas, and oceanic areas, as well as the ability to reach disaster zones or areas of time-critical concern in a timely manner.

In comparison to ground based launchings, the launching of a balloon from a host aircraft generally requires additional components to protect the thin envelope material of the balloon from stresses as caused by air turbulence in the vicinity of the aircraft, high air speeds, and/or tumbling that may result after ejection from the host aircraft moving at high speed.

The disclosure provided herein allows for the launch of one or more balloons from an aircraft. In particular, a container may be ejected from an aircraft, with the container having a first drag device, such as a parachute, to slow down the deployment speed of the container, reorient the container, and to deploy a main parachute consisting of an envelope which shields the balloon from on-rushing air whilst it is inflated by a gas tank located in the container. The inflated balloon can then be released through an opening in the parachute. During the decent of the main parachute, one or more balloons can sequentially be inflated and released.

Previous systems are limited by (a) the possibility to launch multiple balloons (U.S. Pat. No. 3,366,345), (b) generate considerable drag by means of a parachute as needed for low descent velocities with heavy gas tanks (U.S. Pat. No. 3,366,345), (c) provide shielding against air turbulence (U.S. Pat. No. 2,967,677), or (d) allow the launch of lighter than air vehicles (U.S. Publication No. 2015/0266578).

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

According to an illustrative aspect, the balloon launch system may include a container which is ejected from an aircraft. The container may have a first drag device, such as a parachute, to slow down the deployment speed of the container, reorient the container until a vertical decent phase is reached, and pull out a main parachute. The main parachute may contain a compartment in which a balloon may be inflated and shielded from on-rushing air. A gas tank may be used to inflate the balloon. The inflated balloon may be released through an opening in the parachute. If desired, more balloons may be launched in a sequential manner by repeated inflation and subsequent release.

In another illustrative aspect, the balloon may have a payload which is attached to the balloon via a cord and/or hose such that the payload may be released together with the balloon.

In another illustrative aspect, the main parachute may be made of wind impermeable material including but not limited to Kevlar, Nylon, or a synthetic fabric.

In another illustrative aspect, the main parachute may have an outer diameter of more than 10 m, and an inner opening through which the balloon is released which may have a diameter of more than 2 m.

In another illustrative aspect, the balloon may be filled with helium, hydrogen, hot air, or one or more other lighter-than-air gases.

In another illustrative aspect, the balloon may be a weather balloon made of latex, neoprene, Mylar, a synthetic fabric, or other suited materials and may have a diameter at ground pressure of more than 1.5 m.

In another illustrative aspect, the container may contain one or more pressurized gas tanks, one or more valves, a computing device which is capable of opening and closing respective valves and releasing respective balloons by disconnecting respective balloons from the container and/or valves or other holders.

In another illustrative aspect, the computing device may be associated with a non-transitory computer-readable storage medium, which may have computer-readable instructions stored thereon, that are executable by the computing device to cause the computing device to perform functions comprising operating the control unit to open and/or close valves, read environmental sensors including barometers or other altitude sensors and geolocation sensors, such as a GPS receiver, magnetometers, and/or accelerometers to control the opening and/or closing of respective valves and the release of respective balloons as a function of time, altitude, location, descent velocity, or in another desired manner.

In another illustrative aspect, the computing device may be associated with a non-transitory computer-readable storage medium, which has computer-readable instructions stored thereon that are executable by the computing device to cause the computing device to perform functions comprising the control of opening the drag parachute and/or opening the main parachute as a function of time, altitude, location, decent velocity or in another desired manner.

In another illustrative aspect, the container may contain a gas heating device which is capable of inflating a hot air balloon.

In another illustrative aspect, the container may contain an ignition device which is capable of starting a combustion process required to inflate and launch a hot air balloon.

In another illustrative aspect, the container may contain solid, liquid, and/or gaseous components which, by controlled reaction, are capable of generating lighter-than-air gas required to inflate and launch a balloon.

The details of these and other aspects of the disclosure are set forth in the accompanying drawings and descriptions below. Other features and advantages of aspects of the disclosure may be apparent from the descriptions and drawings.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Aspects described herein relate to an apparatus, system, and method for the airborne launch of inflatable, lighter-than-air devices from aircraft. The apparatus and/or system may be used in diverse commercial, defense, environmental, and telecommunication-related applications. In some instances, the apparatus or system may also be used for the airborne launch of inflatable, lighter-than-air devices in zones of disaster or emergency. In such cases, access via ground or sea vehicles, such as trucks, cars, trains, or ships, may often be limited, if not impossible. However, such zones may be approachable by airplane and a balloon may then be deployed at a desired location to provide large area coverage for telecommunication or aerial imaging applications for durations of several days or more. Similarly, distant and difficult to reach areas for which long-term environmental monitoring is required, such as the arctic regions over which geostationary satellite coverage can be limited, may be accessed by airplane and a balloon with desired payload may be deployed.

The main advantages of the balloon launch system are: (a) a high air drag design of the main parachute which allows for low descent velocities and increased mass of the gas tanks, (b) the possibility to launch multiple balloons, (c) the descent speed is unaffected by the release of a balloon leading to predictability of the descent rate and decent time, and (d) a relatively small amount of envelope material which is needed for the main parachute.

Figure 1:
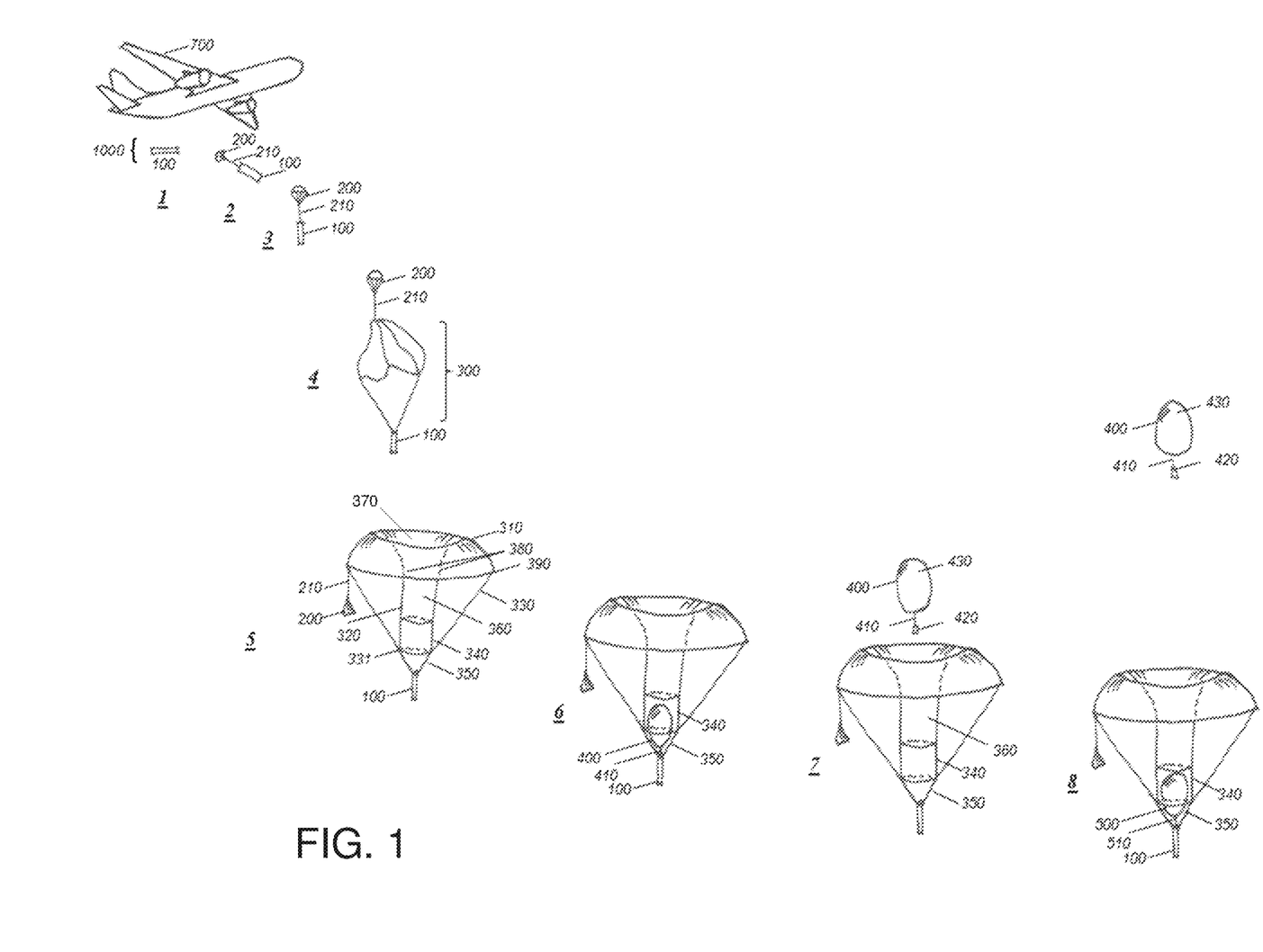
FIG. 1 illustrates a schematic launch sequence of a balloon launch system according to one or more illustrative aspects described herein.

FIG. 1 illustrates a schematic launch sequence of a balloon launch system 1000 according to one or more illustrative aspects described herein. In some instances, the balloon launch system 1000 may include container 100 and the various components comprised therein. Each step illustrated in FIG. 1 may refer to launch system 1000, however, for brevity, system 1000 is only indicated with respect to step 1.

At step 1, container 100 may be ejected form an aircraft, which may either be an airplane 700, as shown in FIG. 1, or another type of aircraft, such as a helicopter, rocket, balloon, or spacecraft. After ejection from aircraft 700, atmospheric friction and drag effects may begin reducing the initial horizontal deployment speed of container 100. Container 100 may be a protective balloon deployment casing and may be manufactured in a three-dimensional shape such as a cylinder, cone, cube, sphere, and the like. Container 100 may be manufactured out of any one, or combination of, plastic, rubber, metal, wood, ceramic, and the like, and may have a hollow internal cavity in which components such as drag parachute 200, cord 210, main parachute assembly 300, main parachute 310, cords 320, 330, fastenings 331, envelopes 340, 350, balloon envelope 400, hose 410, balloon payload 420, and the like are stored. Container 100 may be configured to protect such components from stress caused by air turbulence during ejection of container 100 out of aircraft 700, as well as during decent.

At step 2, the aerodynamic effects on container 100 may cause drag parachute 200 to deploy from the internal cavity of container 100. Drag parachute 200 may be manufactured from one or more wind impermeable materials including but not limited to Kevlar, Nylon, and/or a synthetic fabric. Drag parachute 200 may be connected to main parachute assembly 300 inside the container 100 through a cord 210. In some instances, a portion of drag parachute 200 may be configured to protrude from an upper face of container 100. In such instances, the atmospheric friction and drag effects may apply a pulling force to the portion of drag parachute 200 and cause the entirety of drag parachute 200 to be expelled from the interior cavity of container 100.

Additionally and/or alternatively, the entirety of drag parachute 200 may be encapsulated inside container 100, but may be expelled from the interior cavity of container 100 by way of a discharge mechanism, which may or may not be pressurized. In some instances, container 100 may include a computing device and/or microcontroller including one or more processors, memory, and communication interfaces (e.g., wide area network (WAN), cellular network, Wi-Fi network, Bluetooth, and the like), and a plurality of environmental sensors such as sound, ultra violet, temperature, humidity, pressure, altitude, global positions system (GPS), barometer, magnetometer, accelerometer, and the like, which may generate data regarding the atmospheric conditions surrounding container 100. The computing device and/or microcontroller of container 100 may be configured to activate the discharge mechanism to expel the drag parachute 200 from container 100 based on data generated by one or more of the plurality of environmental sensors. For instance, if the data generated by one or more of the plurality of environmental sensors indicates that a data value associated with container 200 has increased/decreased beyond a certain threshold, the computing device and/or microcontroller of container 100 may be configured to activate the discharge mechanism to expel the drag parachute 200 from container 100. In some instances, the data values may correspond to the horizontal velocity, rotational velocity, descent velocity, altitude, location, temperature, and the like of container 100. In other instances, the data value may be associated with a duration of time since the expulsion of container 100 from aircraft 700, and the computing device and/or microcontroller of container 100 may be configured to activate the discharge mechanism to expel the drag parachute 200 from container 100 based on the duration of time surpassing a predetermined threshold.

At step 3, the aerodynamic drag of drag parachute 200 may further slow down the balloon launch system 1000 including container 100, cord 210, and drag parachute 200 resulting in a nearly vertical orientation and decent thereof.

At step 4, main parachute assembly 300, which may be connected to cord 210, may be pulled out of container 100. In some instances, the atmospheric friction and drag effects on drag parachute 200 may cause a pulling force to be applied to cord 210 and main parachute assembly 300 attached thereto. The pulling force may cause main parachute assembly 300 to be expelled from container 100.

Additionally and/or alternatively, main parachute assembly 300 may be expelled from the interior cavity of container 100 by way of a discharge mechanism, which may or may not be pressurized. The discharge mechanism may be the same discharge mechanism as described above, or may be a different discharge mechanism. The computing device and/or microcontroller of container 100 may be configured to activate the discharge mechanism to expel main parachute assembly 300 from container 100 based on data generated by one or more of the plurality of environmental sensors. In some instances, the computing device and/or microcontroller of container 100 may be configured to activate the discharge mechanism to expel main parachute assembly 300 from container 100 based on a duration of time since the expulsion of container 100 from aircraft 700 or since the deployment of drag parachute 200.

At step 5, main parachute assembly 300 may be fully deployed, leading to a further reduction of the descent speed of container 100. Main parachute assembly 300 may comprise a thin and flexible material capable of forming a shape, referred to hereinafter as main parachute 310 and/or canopy 310, causing atmospheric drag. Main parachute 310 may be manufactured from one or more wind impermeable and/or wind permeable materials including but not limited to Kevlar, Nylon, and/or a synthetic fabric. Cords 320 may attach to inner edge 380 of main parachute 310 and extend to container 100 and cords 330 may attach to outer edge 390 of main parachute 310 and extend to container 100. Cords 320 and cords 330 may intersect at fastening position 331 before extending to container 100. Main parachute 310 may have an annular shape with centric opening 370 in the centermost portion through which balloons may be configured to exit. Centric opening 370 may be the topmost, exit portion of a channel extending through envelopes 340, 350, 360 to container 100. In some instances, the shape of canopy 310 may be symmetrical to the vertical and/or horizontal axes and may have a circular or round shape, a rectangular shape, a pentagonal shape, a hexagonal shape, an octagonal shape, or an otherwise desired shape with a hole in the centermost portion. In some instances, canopy 310 may have an outer diameter (e.g., outer edge 390) of 10 m or more, and an inner opening (e.g., centric opening 370) of 2 m or more in diameter. However, canopy 310 may have an outer diameter ranging from 2.5 m to 17.5 m and an inner opening ranging from 0.5 m to 3.5 m in diameter.

In some instances, the centric opening 370 of canopy 310 may have a shape similar to that of canopy 310 (e.g., a circular or round shape, a rectangular shape, a pentagonal shape, a hexagonal shape, an octagonal shape, or an otherwise desired shape). Alternatively, the centric opening 370 of canopy 310 may be a different shape to that of canopy 310. For instance, canopy 310 may have a pentagonal shape and centric opening 370 may have a circular shape.

Additionally and/or alternatively, centric opening 370 may be an offset opening and, as such, may be located at a position other than the centermost portion of canopy 310. For instance, the offset opening may be radially displaced from the centermost portion of canopy 310. The channel extending from the offset opening through envelopes 340, 350, 360 to container 100 may be angled from the offset opening to container 100. In some instances, the channel extending from the offset opening through envelopes 340, 350, 360 to container 100 may be vertically aligned with the offset opening and container 100. In such instances, container 100 may be offset from the centermost portion of canopy 310.

In other instances, centric opening 370 may be one of a plurality of openings located at various positions on canopy 310. The plurality of openings may be symmetrically and/or radially positioned around canopy 310 and/or may be asymmetrically positioned on canopy 310. Each of the plurality of openings may be connected by a particular channel of a plurality of channels through various envelopes associated with the particular channel to container 100. Alternatively, each of the plurality of openings may be connected by a particular channel of a plurality of channels through various envelopes associated with the particular channel to a particular container of a plurality of containers. In some instances, the plurality of containers may be connected through a larger, encompassing container.

Envelope 350, which may be made of thin, flexible, and air impermeable material, may extend from an upper edge of container 100 along to the fastening position 331 where cords 320, 330 intersect. As such, envelope 350 may form a first windshield, which may protect balloons during inflation. Envelope 340, which may be made of thin, flexible, and air impermeable material, may extend from the position of the fastenings 331 along, and surrounding, cords 320, thereby forming a second windshield. Envelope 360, which may be made of thin, flexible, and air permeable material, may extend from the upper edge of envelope 340 to inner edge 380 of main parachute 310 such that, in combination with envelope 340 and envelope 350, a release channel for an inflated balloon may be formed. The release channel formed by envelopes 340, 350, 360 may culminate at centric opening 370, which may be a topmost, exit portion of the release channel.

Canopy 310 may be connected to container 100 through cords 320, 330, which may be respectively connected to inner edge 380 and outer edge 390 of canopy 310. In some instances, cords 320, 330 may be attached to container 100 and main parachute 310 by way of clips, carabineers, buckles, and/or the like. The weight of container 100, in combination with the drag resistance of main parachute 310, may induce strain on cords 320, 330 so that cords 320, 330 may be under tension and elongated. Cords 320 may be attached to inner edge 380 of main parachute 310 and may be surrounded by one or more envelopes 340, 350, 360.

Envelopes 340, 350, which may be manufactured from a material that may be wind impermeable, may surround cords 320 such that a compartment is created capable of shielding a balloon during inflation from on-rushing air and turbulence. Further, envelope 360 may be manufactured from a wind permeable material such that static and/or non-static air pressure proximate to canopy 310 does not lead to a compression of the opening of the compartment preventing the deployment of the one or more balloons. However, in some instances, each of the envelopes 340, 350, 360 may be made of the same material.

Figure 2:
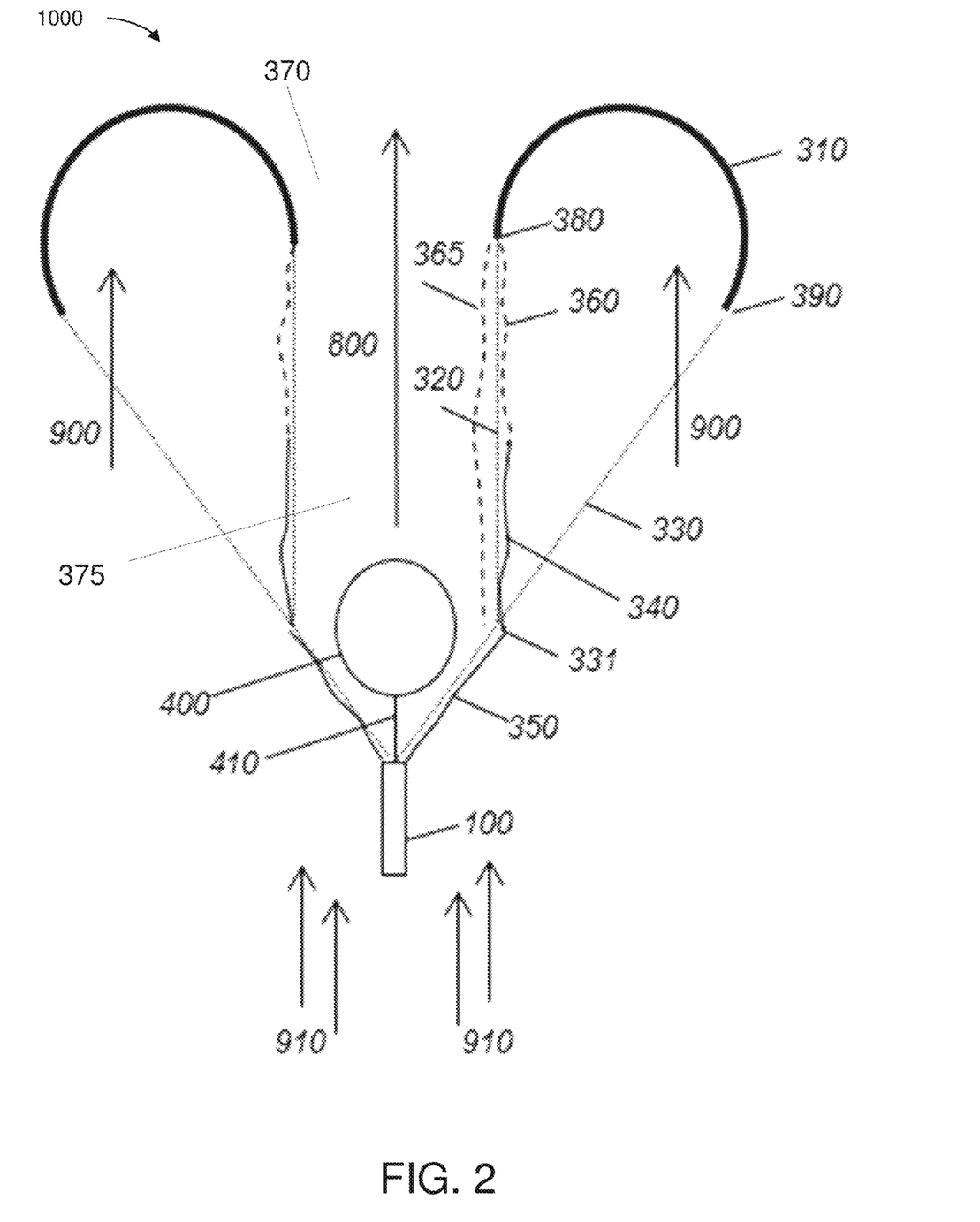
FIG. 2 illustrates a first cross-sectional view of the balloon launch system according to one or more illustrative aspects described herein.

Referring to FIG. 2, and in greater detail in regard to step 5 of FIG. 1, balloon launch system 1000 is shown. Balloon launch system 1000 may include main parachute 310, inflated balloon envelope 400, and container 100. Cords 330 may be connected to outer edge 390 of main parachute 310 and to container 100 and cords 320 may be connected to inner edge 380 of canopy 310 and to container 100. Envelope 350, which may be made of thin, flexible, and air impermeable material, may extend form the upper edge of container 100 along to the position of fastenings 331. Envelope 340, which may be made of thin, flexible, and air impermeable material, may extend from the position of fastenings 331 along and surrounding the cords 320 thereby forming another windshield. Envelope 360, which may be made of thin, flexible, and air permeable material, may extend from the upper edge of envelope 340 to inner edge 380 of main parachute 310 such that, in combination with envelope 340 and envelope 350, release channel 375 may be formed through which an inflated balloon may traverse out of main parachute assembly 300 through centric opening 370. Envelope 360, in proximity to inner edge 380 of the main parachute 310, may be air permeable such that static air pressure close to the main parachute does not lead to a compression of the opening or a compression of the channel formed by envelope 360. Envelope 365, which may be air permeable and which may extend from the position of fastenings 331 along to inner edge 380 of main parachute 310, may further protect the balloon envelope 400 during release. Release channel 375 through which a balloon may be released is further indicated by arrow 800. The air flow causing drag in proximity of the parachute is indicated by arrows 900. Arrows 910 indicate on-rushing air from which the balloon envelope 400 is protected by envelope 350 and envelope 340.

Referring back to FIG. 1, at step 6, balloon envelope 400 may be inflated. In some instances, balloon envelope may be inflated with one or more of helium, hydrogen, hot air, and/or one or more other lighter-than-air gases. Balloon envelope 400 may be a weather balloon and may be manufactured from one or more of latex, neoprene, Mylar, a synthetic fabric, and/or other suited materials. Balloon envelope 400 may have a diameter at ground pressure of 1.5 m or more. However, in some instances, balloon envelope 400 may have a diameter at ground pressure ranging from 0.375 m to 2.625 m.

As stated above, balloon envelope 400 may be protected against on-rushing air by envelope 350 and envelope 340. Balloon envelope 400 may be connected via a hose 410 to a gas tank comprised within container 100. The gas tank of container 100 may contain gas and may be configured to dispense the gas through hose 410 into interior 430 of balloon envelope 400. The flow of gas may be regulated through a valve which may be opened and closed by the computing device and/or microcontroller of container 100. Hose 410 may include a one-way valve and, as such, may be configured to allow gas to flow into balloon envelope 400, but not out from balloon envelope 400.

In some instances, the opening and/or closing of the valve by the computing device and/or microcontroller of container 100 may be performed based on control signals received from an external computing device. As such, the computing device and/or microcontroller of container 100 may be communicatively coupled to a communication interface through which information may be received and transmitted. For example, the computing device and/or microcontroller may be configured to receive a control signal from an external computing device via the communication interface that causes the computing device and/or microcontroller to open the valve. In some instances, the computing device and/or microcontroller may receive another control signal from the external computing device to close the valve, or may close the valve based on instructions stored in memory. Such instructions may cause the computing device and/or microcontroller to close the valve after a predetermined period of time, after a predetermined amount of gas been released from the tank, and/or after a predetermined inflation level of balloon envelope 400.

Additionally and/or alternatively, the opening and/or closing of the valve by the computing device and/or microcontroller of container 100 may be performed based on data generated by one or more of the plurality of environmental sensors. For example, the opening and/or closing of the valve may be based on one or more data values which have increased/decreased beyond a certain threshold. In some instances, the data values may correspond to the horizontal velocity, rotational velocity, descent velocity, altitude, location, temperature, and the like of container 100. Further, the computing device and/or microcontroller of container 100 may be configured to open and/or close the valve based on a duration of time since the expulsion of container 100 from aircraft 700, since the deployment of drag parachute 200, and/or since the deployment of main parachute assembly 300.

In some instances, after balloon envelope 400 has been inflated and the valve has been closed by the computing device and/or microcontroller of container 100, balloon envelope 400 may be released. In particular, balloon envelope 400 may be secured to container 100 during inflation by way of hose 410. After inflation has been completed, computing device and/or microcontroller of container 100 may activate a release mechanism causing hose 410 of the balloon envelope 400 to be released.

Figure 3:
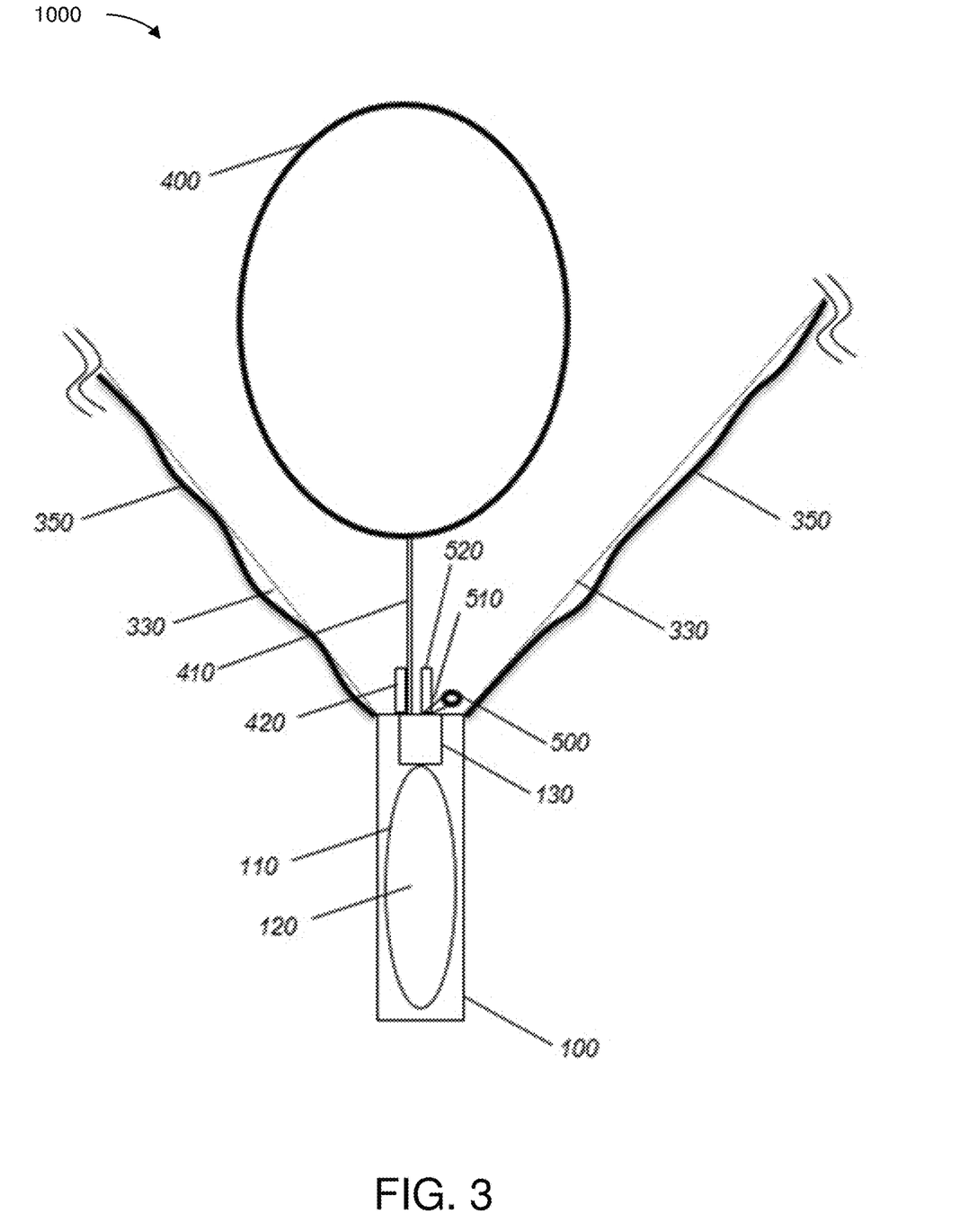
FIG. 3 illustrates a second cross-sectional view of the balloon launch system according to one or more illustrative aspects described herein.

Referring to FIG. 3, and in greater detail in regard to step 6 of FIG. 1, balloon launch system 1000 is shown. Balloon launch system 1000 may include inflated balloon envelope 400 and container 100. Cords 330 may be connected to outer edge 390 of main parachute 310 and to container 100. Envelope 350, which may be made of thin, flexible, and air impermeable material, may protect balloon envelope 400 from on-rushing air. Container 100 may include gas tank 110 comprising pressurized gas 120. In some instances, gas tank 110 may be connected to computing device and/or microcontroller 130. Computing device and/or microcontroller 130 may be communicatively coupled to one or more valves such that the computing device and/or microcontroller 130 may be capable of regulating the flow of pressurized gas 120 from gas tank 110 through a particular valve of the one or more valves into hose 410 to inflate balloon envelope 400. Upon execution of instructions stored within memory of computing device and/or microcontroller 130, one or more valves may be opened and/or closed to inflate the not yet inflated balloon envelope 400 by a gas flow from gas tank 120 through the one or more valves and hose 410 to the inside of balloon envelope 400. Computing device and/or microcontroller 130 may also be communicatively coupled to a release mechanism which, upon activation by computing device and/or microcontroller 130 based on instructions stored in memory, may close, seal, and release hose 410, or another hose such that inflated balloon envelop 400 may be released and ascend with a payload 420 or another payload which is connected to hose 410.

Another uninflated and stowed balloon envelope 500 may be connected via another hose 510 to one of the one or more valves communicatively coupled to computing device and/or microcontroller 130. Payload 520 may be connected to the balloon envelope 500 via hose 510. As will be described in further detail below, balloon envelope 500 may be inflated, closed, sealed, and released in a similar manner to that of balloon envelope 400 after the release of balloon envelope 400.

In some instances, container 100 may include a gas heating device capable of inflating balloon envelope 400 with hot air. Additionally and/or alternatively, container 100 may include an ignition device capable of starting a combustion process required to inflate and launch balloon envelope with hot air. In other instances, container 100 may include solid, liquid, and/or gaseous components which, by controlled reaction, may be capable of generating lighter-than-air gas required to inflate and launch balloon envelope 400. Each of such inflation devices and/or methods may be controlled by computing device and/or microcontroller 130 and may be known as a balloon inflation mechanism.

Referring back to FIG. 1, at step 7, inflated balloon envelope 400 may ascend to higher altitudes after its release and traverse through release channel 375 formed by envelopes 340, 350, 360 and through centric opening 370 of canopy 310. As described above, interior 430 of balloon envelope 400 may be filled with lighter-than-air gas. Hose 410 may connect balloon envelope 400 with balloon payload 420. Balloon payload 420 can contain a variety of desired systems including but not limited to control systems, power systems, observation systems, environmental sensor systems, communication systems, or other systems. The balloon and its payload may include, e.g., the system described in pending U.S. application Ser. No. 14/995,504, filed Jan. 14, 2016, entitled "Payload Orientation Control and Stabilization", herein incorporated by reference in its entirety for all purposes.

At step 8, the inflated and released balloon envelope 400, hose 410, gas contained in the interior 430 of balloon envelope 400, and balloon payload 420 may ascend further. Simultaneously, another balloon envelope 500 may be inflated. Balloon envelope 500 may be protected against on-rushing air by envelope 350 and envelope 340. Balloon envelope 500 may be connected via hose 510 to a gas tank comprised within container 100. The gas tank of container 100 may contain gas and may be configured to dispense the gas through hose 510 in the manner described above regarding balloon 400. The flow of gas may be regulated through a valve which may be opened and closed by the computing device and/or microcontroller of container 100. Hose 510 may include a one-way valve and, as such, may be configured to allow gas to flow into balloon envelope 500, but not out from balloon envelope 500.

In some instances, after balloon envelope 500 has been inflated and the valve has been closed by the computing device and/or microcontroller of container 100, balloon envelope 500 may be released. In particular, balloon envelope 500 may be secured to container 100 during inflation by way of hose 510. After inflation has been completed, computing device and/or microcontroller of container 100 may activate a release mechanism causing hose 510 of the balloon envelope 400 to be released.

For example, upon execution of instructions stored within memory of computing device and/or microcontroller 130, one or more valves may be opened and/or closed to inflate the not yet inflated balloon envelope 500 by a gas flow from gas tank 120 through the one or more valves and hose 510 to the inside of balloon envelope 500. Computing device and/or microcontroller 130 may also be communicatively coupled to a release mechanism which, upon activation by computing device and/or microcontroller 130 based on instructions stored in memory, may close, seal, and release hose 510, or another hose such that inflated balloon envelop 500 may be released and ascend with a payload 520 or another payload which is connected to hose 510. If desired, more balloons may be launched in a sequential manner by repeated inflation and subsequent release.

Figure 4A:
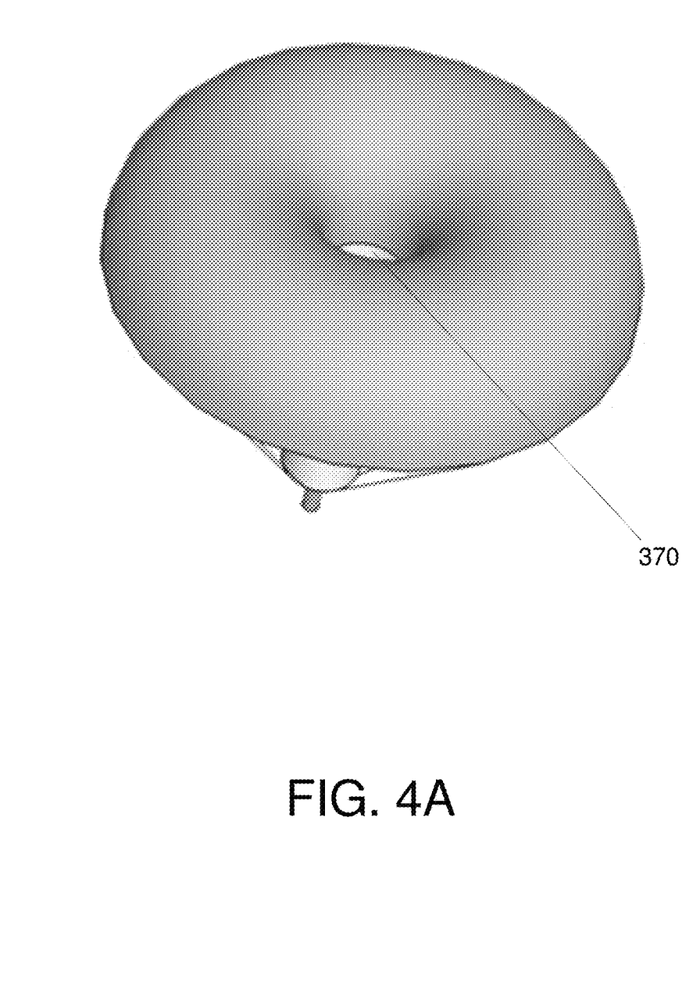
FIGS. 4A and 4B respectively illustrate a top and bottom perspective view of the balloon launch system with the main parachute having a circular shape according to one or more illustrative aspects described herein.
Figure 4B:
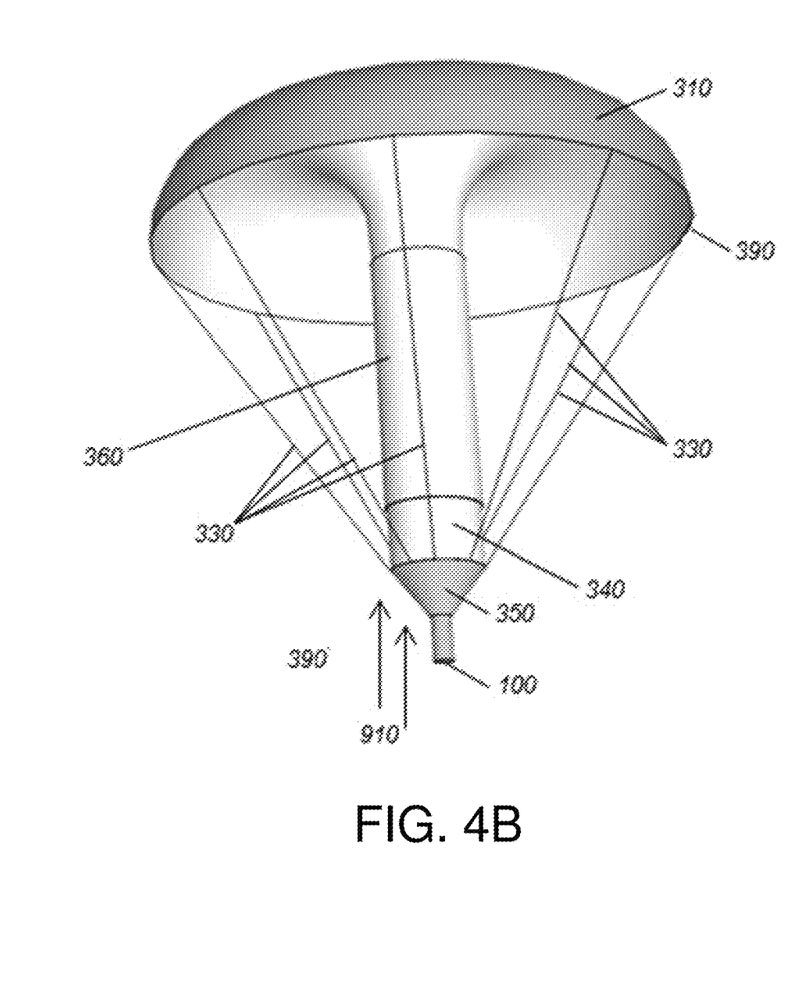

FIGS. 4A and 4B respectively illustrate a top and bottom perspective view of the balloon launch system with main parachute 310 having a circular shape according to one or more illustrative aspects described herein. Cords 330 may connect outer edge 390 of main parachute 310 with container 100. During descent of main parachute 310, envelope 340 and envelope 350 protect a balloon envelope (e.g., balloon envelope 400, 500) in the course of its inflation and/or release from on-rushing air indicated by arrows 910. Envelope 360, in proximity to main parachute 310, may be manufactured from an air permeable material such that static air pressure close to main parachute 310 does not lead to a compression of the opening or a compression of envelope 360 which forms a channel through which an inflated and released balloon can traverse.

Figure 5A:
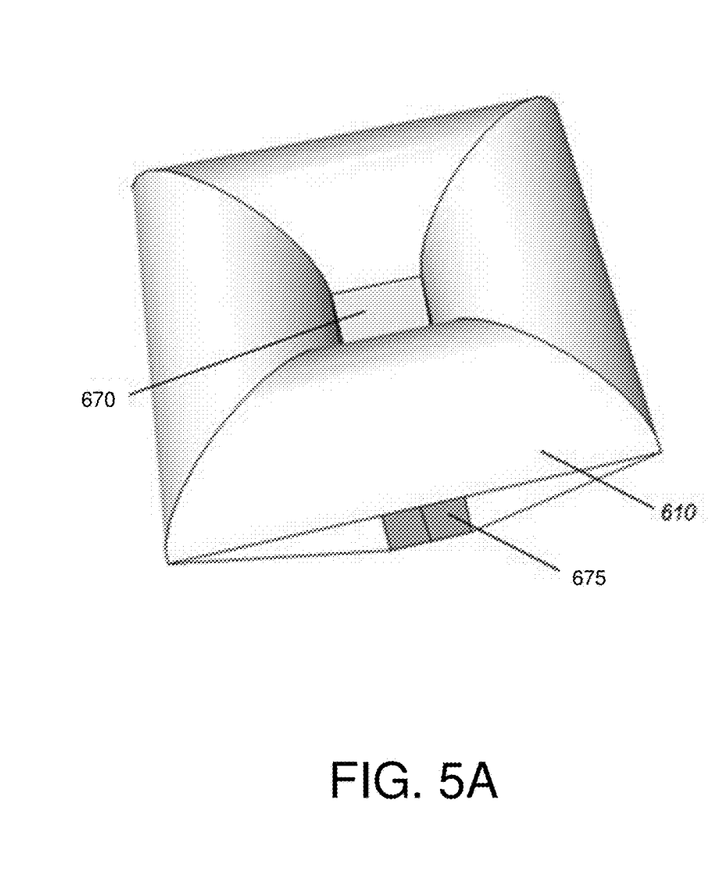
FIGS. 5A and 5B respectively illustrate a top and bottom perspective view of the balloon launch system with the main parachute having a rectangular shape according to one or more illustrative aspects described herein.
Figure 5B:
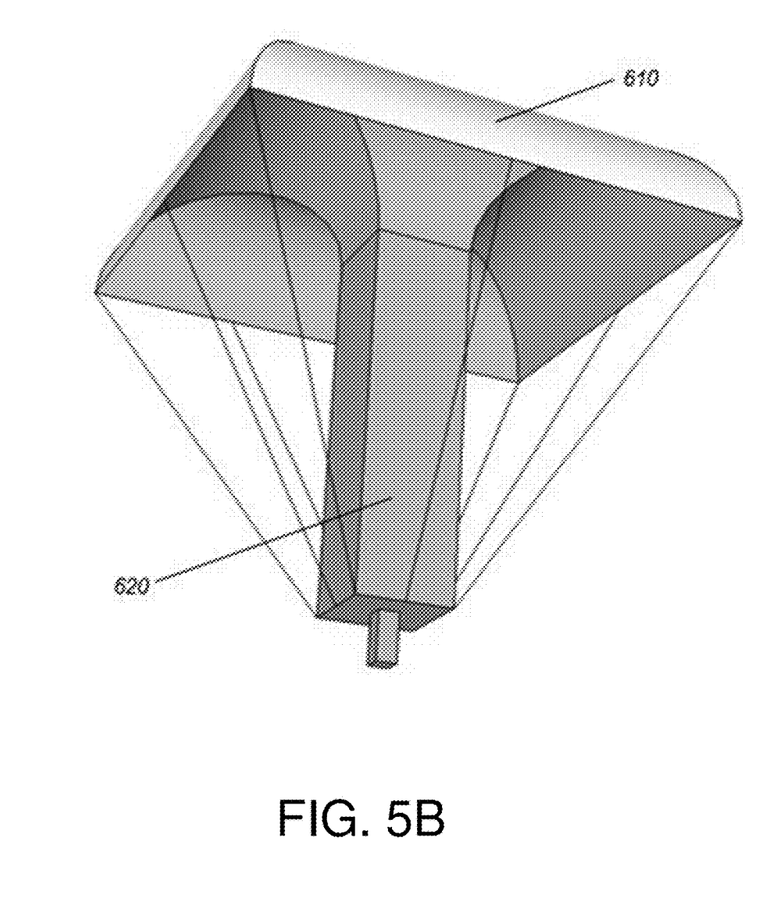

FIGS. 5A and 5B respectively illustrate a top and bottom perspective view of the balloon launch system 1000 with main parachute 610 having a rectangular shape according to one or more illustrative aspects described herein. Main parachute 610 may have a rectangular shape and a rectangular shaped channel 675 for the release of a balloon envelope (e.g., balloon envelope 400, balloon envelope 500, and the like) through a centric opening 670 in the main parachute 610.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A balloon launch system comprising:
   a container;
   a parachute attached to the container and comprising an opening;
   one or more balloon envelopes stored in the container;
   a first plurality of cords connecting the opening of the parachute with the container;
   a release channel comprising one or more envelopes which surround the first plurality of cords and which shield the one or more balloon envelopes from on-rushing air; and
   a computing device which controls inflation, sealing, and release of the one or more balloon envelopes through the release channel.

2. The balloon launch system of claim 1, further comprising:
   a gas tank pressurized with a lighter-than-air gas, the gas tank being stored in the container; and
   one or more valves,
   wherein the gas tank is connected to the one or more valves, and wherein the one or more valves are configured to be opened and closed by the computing device.

3. The balloon launch system of claim 2, wherein one of the one or more balloon envelopes is connected to one of the one or more valves by a hose such that a lighter-than-air gas flows from the gas tank into the one or the one or more balloon envelopes.

4. The balloon launch system of claim 1, wherein the container comprises one or more of solid, liquid, and gaseous components, which, by a controlled reaction, are capable of generating a lighter-than-air gas required to inflate and launch the one or more balloon envelopes.

5. The balloon launch system of claim 1, wherein releasing of the one or more balloon envelopes comprises the one or more balloon envelopes traversing the release channel and exiting the balloon launch system from the opening of the parachute.

6. The balloon launch system of claim 1, wherein the parachute extends radially from the opening to an outer edge, and wherein a shape of the parachute is:
   symmetrical to one or more of a vertical and horizontal axis of the balloon launch system; and
   any one of a circular, round, rectangular, pentagonal, hexagonal, octagonal shape.

7. The balloon launch system of claim 1, further comprising:
   a second plurality of cords connecting an outer edge of the parachute to the container, wherein the first plurality of cords and the second plurality of cords intersect at a fastening position above the container.

8. The balloon launch system of claim 7, wherein the one or more envelopes comprises:
   a first protective envelope extending from the container to the fastening position;
   a second protective envelope extending from an upper edge of the first protective envelope upward along the first plurality of cords; and
   a third protective envelope extending from an upper edge of the second protective envelope to the opening.

9. The balloon launch system of claim 8, wherein the first and second protective envelopes are made of a first material, and the third protective envelope is made of a second material.

10. The balloon launch system of claim 1, wherein the container includes a balloon inflation mechanism configured to inflate the one or more balloon envelopes.

11. The balloon launch system of claim 10, further comprising:
    one or more sensors, wherein the computing device is configured to activate the balloon inflation mechanism based on data from the one or more sensors.

12. The balloon launch system of claim 1, wherein the parachute is deployed from the container by a drag force produced by a drag parachute.

13. The balloon launch system of claim 1, wherein the opening is connected to the release channel, and wherein the opening is positioned in a centermost portion of the parachute.

14. The balloon launch system of claim 1, wherein the opening has a same shape as the parachute.

* * * * *